United States Patent
Fateev et al.

(10) Patent No.: US 8,261,286 B1
(45) Date of Patent: Sep. 4, 2012

(54) FAST SEQUENTIAL MESSAGE STORE

(75) Inventors: Maxim E. Fateev, Seattle, WA (US);
Alan Stuart Robbins, Mercer Island, WA (US); Marvin M. Theimer, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 1082 days.

(21) Appl. No.: 12/176,222

(22) Filed: Jul. 18, 2008

Related U.S. Application Data

(60) Provisional application No. 61/073,733, filed on Jun. 18, 2008.

(51) Int. Cl.
*G06F 9/46* (2006.01)
*G06F 15/16* (2006.01)
*G06F 11/00* (2006.01)

(52) U.S. Cl. .................. 719/314; 709/203; 714/48
(58) Field of Classification Search .......... 709/203; 714/48; 719/314
See application file for complete search history.

(56) References Cited

U.S. PATENT DOCUMENTS

| | | | |
|---|---|---|---|
| 5,557,798 A | 9/1996 | Skeen et al. | |
| 5,916,307 A * | 6/1999 | Piskiel et al. | 719/314 |
| 5,961,606 A * | 10/1999 | Talluri et al. | 709/234 |
| 6,310,888 B1 | 10/2001 | Hamlin | |
| 6,529,932 B1 * | 3/2003 | Dadiomov et al. | 718/101 |
| 6,738,815 B1 | 5/2004 | Willis, Jr. et al. | |
| 7,139,859 B2 * | 11/2006 | Dastidar et al. | 710/306 |
| 7,213,049 B2 * | 5/2007 | Felt | 709/203 |
| 7,336,675 B2 * | 2/2008 | Naik et al. | 370/412 |
| 7,818,757 B1 * | 10/2010 | Tsimelzon et al. | 719/321 |
| 8,156,177 B2 * | 4/2012 | Bein et al. | 709/203 |
| 2002/0161834 A1 | 10/2002 | Rescorla et al. | |
| 2005/0125557 A1 | 6/2005 | Vasudevan et al. | |
| 2005/0268145 A1 | 12/2005 | Hufferd et al. | |
| 2006/0020635 A1 | 1/2006 | Green | |
| 2006/0179147 A1 | 8/2006 | Tran et al. | |
| 2007/0198437 A1 * | 8/2007 | Eisner et al. | 705/79 |
| 2007/0288466 A1 | 12/2007 | Bohannon et al. | |
| 2009/0133039 A1 * | 5/2009 | Chkodrov et al. | 719/314 |

* cited by examiner

*Primary Examiner* — Charles E Anya
(74) *Attorney, Agent, or Firm* — Knobbe Martens Olson & Bear LLP

(57) ABSTRACT

A broker may be used as an intermediary to exchange messages between producers and consumers. The broker may store and dispatch messages from a physical queue stored in a persistent memory. More specifically, the broker may enqueue messages to the physical queue that are received from producers and may dispatch messages from the physical queue to interested consumers. The broker may further utilize one or more logical queues stored in transient memory to track the status of the messages stored in persistent memory. As messages are dispatched to and acknowledged by interested consumers, the broker deletes acknowledged messages from the physical queue. The messages deleted are those preceding a physical ACKlevel pointer that specifies the first non-acknowledged message in the physical queue. The physical ACKlevel pointer is advanced in the physical queue based on the relative position of corresponding logical ACKlevel pointers maintained by the logical queues.

34 Claims, 9 Drawing Sheets

FAST SEQUENTIAL MESSAGE STORE

CROSS-REFERENCE TO RELATED APPLICATION

This application claims the benefit of U.S. Provisional Application No. 61/073,733, filed Jun. 18, 2008, which application is incorporated herein by reference in its entirety.

BACKGROUND

Integrated processing architectures in which a variety of computing devices and/or applications communicate with each other over a communication network are widely used in e-commerce and enterprise environments. Given the variety and number of computing devices/applications in such architectures, a large volume of messages is communicated between such devices/applications. Accordingly, message brokers are often used to act as an intermediary device or application. The broker facilitates delivery of a message from a source device or application (referred to herein as a "producer") to a destination device or application (referred to herein as a "consumer"). Brokers require a large amount of resources to store and deliver such messages between producers and consumers.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

As will be described herein, a computing device or application referred to as a "broker" may be used as an intermediary to exchange messages between one or more producers and one or more consumers. In one embodiment, the broker stores and dispatches messages from a physical queue stored in a persistent memory accessible to the broker. More specifically, messages may be enqueued to the physical queue by one or more producers and may be dispatched from the physical queue to one or more interested consumers. Each message may be stored in the physical queue along with an acknowledgment identifier (an "ACK ID") that is assigned to the message in a monotonically increasing order. The ACK ID indicates a location of a message in the physical queue. In some embodiments the ACK ID indicates a physical location, while in others embodiments, the ACK ID indicates a logical location. In yet other embodiments, the ACK ID is stored separately from the physical queue. Messages are ultimately deleted from the physical queue after the broker receives acknowledgement messages ("ACKs") from all consumers indicating that the consumers have received and processed the messages from the physical queue without error. Until an ACK is received for a dispatched message, the message is considered "in flight."

In accordance with one embodiment, the status of in flight messages is maintained by one or more logical queues stored in a transient memory accessible to the broker. In one embodiment, a logical queue is a logical view or representation of the physical queue. As such, a logical queue need not store any messages or ACK IDs itself. Rather, whether a message in the physical queue has been acknowledged as received and processed by a consumer (i.e., "ACKed"), is in flight, or is awaiting dispatch (i.e., "backlogged") is noted using one or more pointers to a position within the physical queue, which pointers are maintained by the logical queue. As will be described in more detail below, these pointers are used to determine which messages may be deleted from the physical queue, and thus, removed from persistent memory. In addition, the use of pointers enables the logical queues to manage ACKs that are received out of order as consumers receive and process messages at various speeds and/or times. Using pointers to keep track of the status of ACKed, in flight and backlogged messages results in very low (almost zero) storage space overhead per message stored in persistent memory. Moreover, using logical queues in conjunction with a physical queue necessitates a minimum number of, e.g., one, write operations per message to persistent memory, as well as a minimum number of, e.g., one, read operations per message from persistent memory in normal operations where there are no slow consumers.

Figure 1:
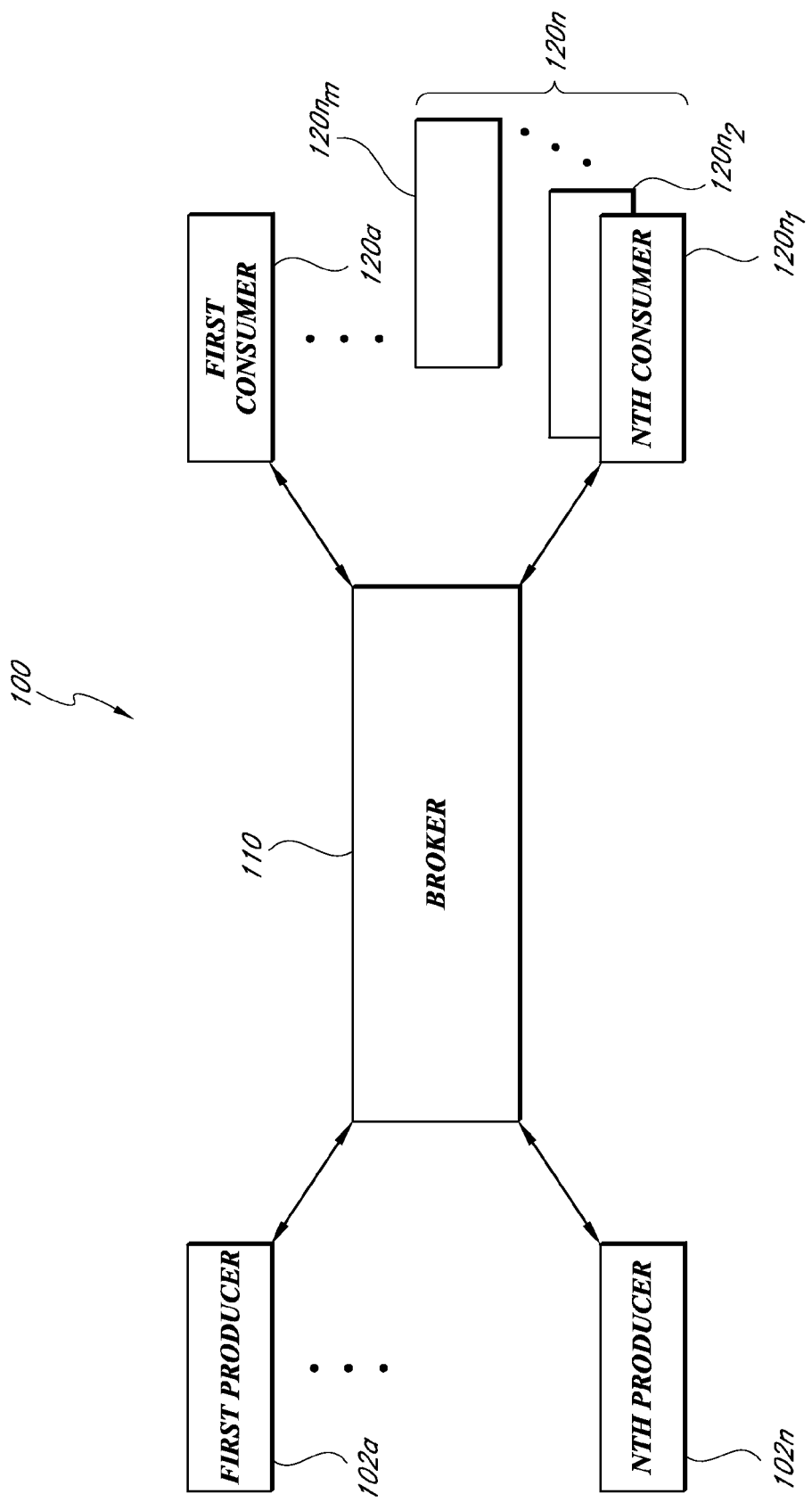
FIG. 1 is a block diagram of an illustrative system in which messages are exchanged between producers and consumers via an intermediary broker.

FIG. 1 is a block diagram of an illustrative system in which a broker 110 is used as an intermediary to exchange messages between one or more producers 102a-102n and one or more consumers 120a-120n. A message may include any relevant information transmitted electronically from a producer to an interested consumer via a broker. A message can contain one or more blocks of data, as well as control information, a header (including, e.g., length, format, destination address, type, identifier, etc.), and error-checking information. Producers 102a-102n may be any computing device or application (referred to herein collectively and interchangeably as a "computing device") capable of generating a message, while consumers 120a-120n may be any computing device capable of consuming a message. It will also be appreciated that in some embodiments, a producer may also act as a consumer and vice versa. Broker 110 may be any computing device capable of receiving messages, accessing messages stored in memory, and dispatching messages. Broker 110 can be co-located with a producer on the same computing device, co-located with a consumer on the same computing device, or be a standalone computing device. In addition, although only a single broker 110 is depicted in FIG. 1, those skilled in the art will appreciate that the system may include a plurality of brokers. In some cases, multiple, redundant brokers may be provided in order to ensure the availability of messages for delivery to interested consumers in the face of failures. Accordingly, consumers and producers may not be limited to communicating with only one broker. Rather, one or more consumers may communicate with multiple brokers.

Producers and consumers may generate and process messages for any purpose. In some embodiments, a producer or consumer may operate to provide a particular service or functionality. For example, first producer 102a may be a software application implemented by a server for placing an order for an item such as a digital camera and consumer 120a may be a software application implemented by a server for fulfilling the order. Accordingly, first producer 102a may generate a message to be provided to consumer 120a requesting fulfillment and providing fulfillment information such as identification of the item ordered, shipping information, etc. In yet other embodiments, a service and/or functionality, such as the fulfillment service referred to above, may result from the operation of multiple computing devices. In such embodiments, the service may be considered a consumer, and each computing device may be considered an instance of that consumer. This is illustratively depicted in FIG. 1, in which the $n^{th}$ consumer 120n is a service provided by a plurality of devices, and each device is depicted as an $n^{th}$ consumer instance $120n_1$-$120n_m$. Accordingly, as a producer, e.g., producer 102a, sends messages to the broker 110 in which consumer 120n is interested, the broker 110 will dispatch the messages from the physical queue 206 to one of the instances $120n_1$-$120n_m$ of the consumer 120n. However, for purposes of the following discussion, reference will be made simply to a "consumer" rather than "consumer instance(s)." Accordingly, those skilled in the art will appreciate that in the following description references to a "consumer" may include a consumer group of one or more instances or a specific consumer instance. Moreover, brokers may forward messages to other brokers, e.g., in a chain, to effect routing, stream splitting or other needs. Accordingly, a downstream broker may be considered a consumer.

Given there may be a plurality of consumers, there may be more than one consumer interested in any given message. Accordingly the same message can be dispatched more than once, e.g., for delivery to different consumers. As will be described in more detail below, this is accomplished by utilizing a logical queue corresponding to each consumer. Accordingly, the logical queue manages the messages that are in flight for its corresponding consumer, but not the messages that are in flight for other consumers.

Figure 2:
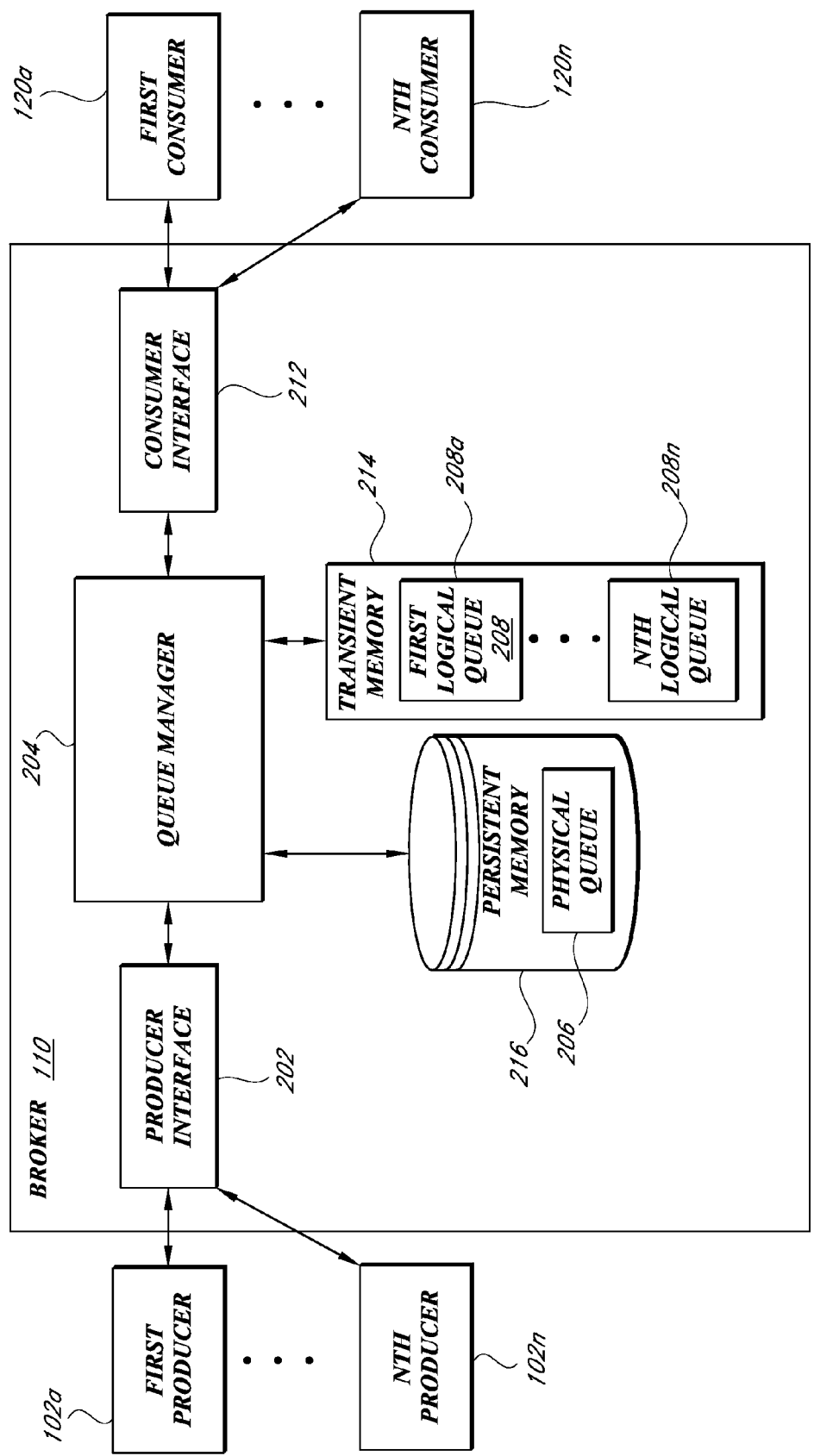
FIG. 2 is a block diagram of representative functional components of the broker shown in FIG. 1.

FIG. 2 is a block diagram of representative functional components of the broker 110 shown in FIG. 1. As illustrated, broker 110 may include, among other things, a producer interface 202, a queue manager 204, and a consumer interface 212. Producer interface 202 may be a software application and/or hardware device that communicatively couples broker 110 to producers 102a-102n via a wired and/or wireless communications network, such as a local area network, a wide area network, an intranetwork, an internetwork, the Internet, etc. Producer interface 202 is configured to receive messages from producers 102a-102n and provide the messages (or translated messages) to queue manager 204. In some embodiments, producer interface 202 also encrypts and decrypts incoming and outgoing messages.

Similarly, consumer interface 212 may be a software application and/or hardware device that communicatively couples broker 110 to consumers 120a-120n via a wired and/or wireless communications network. The consumer interface 212 is configured to receive messages from the queue manager 204, translate the messages if needed, and dispatch the messages to interested consumers 120a-120n. In some embodiments, consumer interface 212 also encrypts and decrypts incoming and outgoing messages. Although illustrated in FIG. 2 as separate interfaces, producer interface 202 and consumer interface 212 may be the same interface. In yet other embodiments, the producer interface 202 and the consumer interface 212 may communicate with other computing devices/components via the same communication connection or via separate communication connections.

In one embodiment, queue manager 204 is a software application and/or hardware device that manages incoming messages from the producers 102a-102n and outgoing messages to interested consumers 120a-120n. More specifically queue manager 204 may utilize a physical queue 206 to store all messages received from producers 102a-102n. In one embodiment, the physical queue is a multi-element, linear data structure stored in a persistent memory 216 (e.g., flash memory, disk, etc.) of the broker 110. Those skilled in the art will recognize that persistent memory may also be referred to as non-volatile memory. While physical queue 206 is depicted in FIG. 2 as stored in persistent memory 216 located within broker 110, those skilled in the art will also recognize that physical queue 206 is not limited to this configuration and can be located local to or remote to broker 110.

The queue manager 204 may further utilize one or more logical queues, e.g., logical queues 208a-208n, to track the status of the messages stored in persistent memory. As noted above, a logical queue is a logical view of the physical queue 206 and need not contain messages or ACK IDs itself. In one embodiment, each logical queue contains a set of pointers to positions within the physical queue 206, which pointers are used to keep track of the messages in the physical queue 206 that are in flight to a particular consumer. In contrast to the physical queue 206, logical queues 208a-208n are stored in transient (a.k.a. volatile) memory 214 (e.g., RAM) of the broker 110 (although in some embodiments, one or more logical queues could be stored in persistent memory or some combination of persistent and transient memory). Accordingly, incoming messages are stored (in sequential order) only in persistent memory 216 in the physical queue 206, thus reducing storage space overhead in persistent memory, eliminating the need for multiple write and reducing the read operations per message in persistent memory, and increasing the speed at which messages are enqueued, dispatched and deleted. Accordingly, the physical queue operates as a fast sequential message store.

In one embodiment, the queue manager 204 maintains a logical queue for each consumer (or group of consumer instances) 120a-120n. Which messages in the physical queue 206 have been ACKed by a particular consumer, which are in flight, and which are backlogged are identified using pointers to certain positions in the physical queue, which pointers are managed by the logical queue corresponding to the particular consumer. Accordingly, a logical queue represents a particular consumer's view of the physical queue. A pointer may be an address of a location in memory, an index to a location in memory, or some other value denoting a location in persistent memory. A pointer may also be a variable containing any of the foregoing. In one embodiment, each pointer maintained by a logical queue is the ACK ID for a message stored in the physical queue. Additional message status data may also be stored with the pointers in the logical queue and used to manage in flight messages. Such message status data may include whether the message is in flight to the consumer, ACKed by the consumer, or whether the message is backlogged waiting to be provided to the consumer. In some embodiments, the message status data can include additional information such as the last time the message was dispatched to a consumer, and how many times this message has been dispatched to one or more consumers. The queue manager 204 may use the message status data to determine if messages are still in flight and update the pointers accordingly.

Figure 3A:
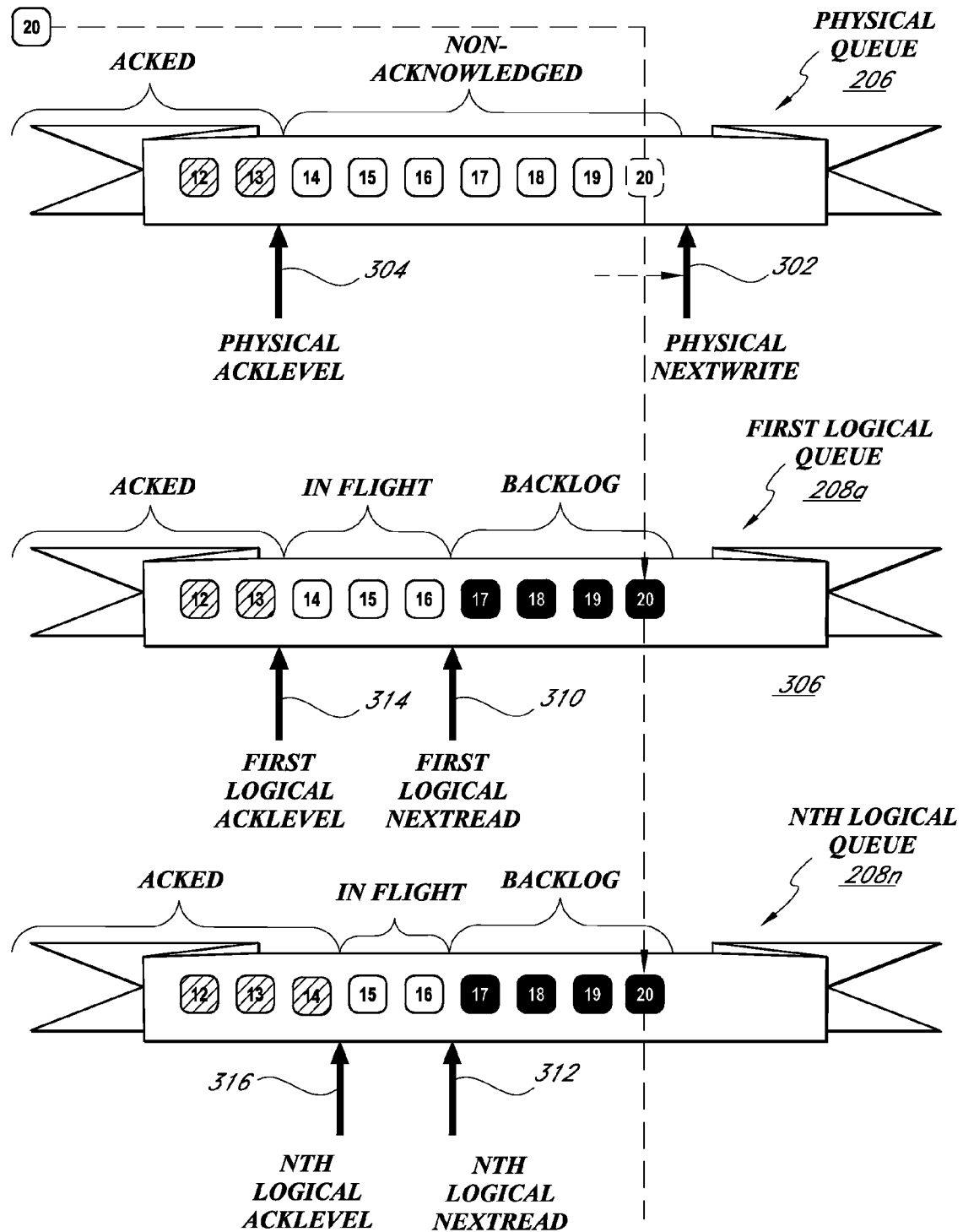
FIGS. 3A-E are pictorial diagrams of illustrative physical and logical queues maintained by the broker shown in FIG. 2.

FIG. 3A is a pictorial diagram of the physical queue 206 and logical queues 208a-208n following receipt of a number of messages from producers 102a-102n. In one embodiment, when a message (e.g., message 20) is received from a producer, such as producer 102a, the message is assigned an ACK ID (which ACK IDs are assigned to messages in monotonically increasing order) and inserted into the physical queue 206 at a next available location for writing a message in the queue, e.g., at the tail end of the queue, i.e., at the position identified by a physical nextWrite pointer 302. Once written to the end of the physical queue 206 (or "enqueued"), the physical nextWrite pointer 302 is advanced to the next available position at the end of the physical queue 206. Accordingly, as messages are received by the broker 110, they are enqueued one after the other to the end of the physical queue 206.

Also depicted in FIG. 3A are a first logical queue 208a and an $n^{th}$ logical queue 208n. Although depicted as containing the same messages and ACK IDs as in the physical queue 206, such messages and the ACK IDs need not be, in fact, stored in the logical queues. However, as noted above, each logical queue is a logical view of the physical queue for a particular consumer. Therefore, for purposes of illustrating the positioning of the pointers maintained by the logical queues, the logical queues are depicted as having messages with corresponding ACK IDs. The pointers maintained by the logical queues actually reference positions in the physical queue 206.

Figure 3B:
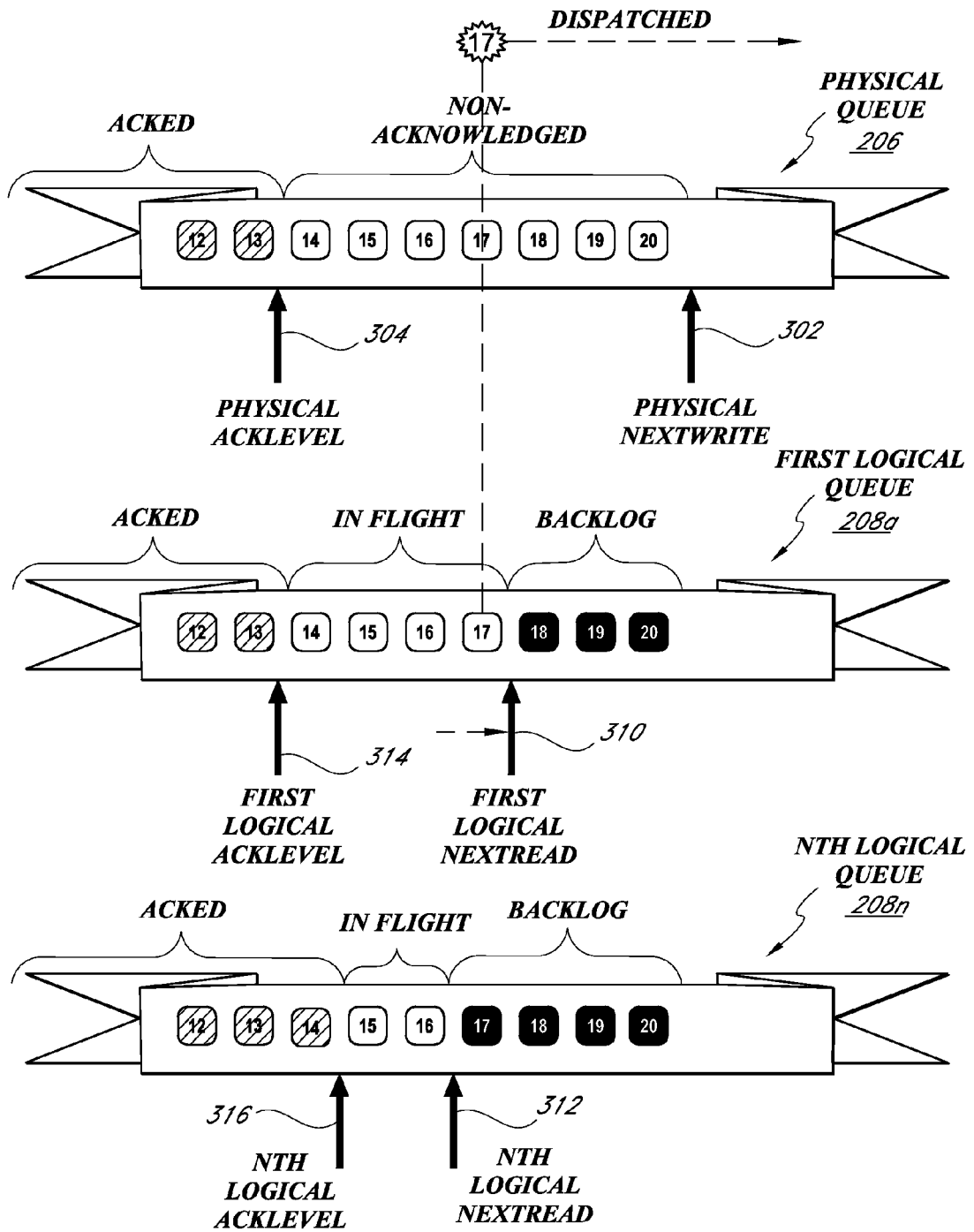

Referring now to FIGS. 3A and 3B, upon request for a message from a consumer corresponding to a logical queue, such as first consumer 120a, queue manager 204 requests the next message to dispatch from the physical queue 206. For example, the queue manager 204 requests the next available, non-dispatched message from the physical queue 206 following a first, logical nextRead pointer 310 associated with the logical queue 208a as shown in FIG. 3A. The logical nextRead pointer specifies the highest ACK ID for a message in the physical queue 206 that has not yet been dispatched to the corresponding consumer 120a. After the queue manager 204 requests the message, a copy of message (i.e., message with ACK ID 17) is dispatched from the physical queue 206 to the first consumer 120a and the logical nextRead pointer 310 maintained by the logical queue 208a is advanced to the next message (i.e., message with ACK ID 18) shown in FIG. 3B. All messages following the logical nextRead pointer are considered backlogged for dispatch to the corresponding consumer. In the example illustrated in FIG. 3B, messages with ACK IDs 18-20 are backlogged after message with ACK ID 17 is dispatched.

In the example illustrated in FIG. 3B, $n^{th}$ consumer 120n, who is also interested in the same messages as first consumer 120a, has not yet requested a message from the broker 110. Accordingly, the $n^{th}$ logical nextRead pointer 312 maintained by the corresponding $n^{th}$ logical queue 208n still specifies the message with ACK ID 17. The $n^{th}$ logical nextRead pointer 312 will not be advanced until the $n^{th}$ consumer 120n corresponding to the $n^{th}$ logical queue requests another message.

Figure 3C:
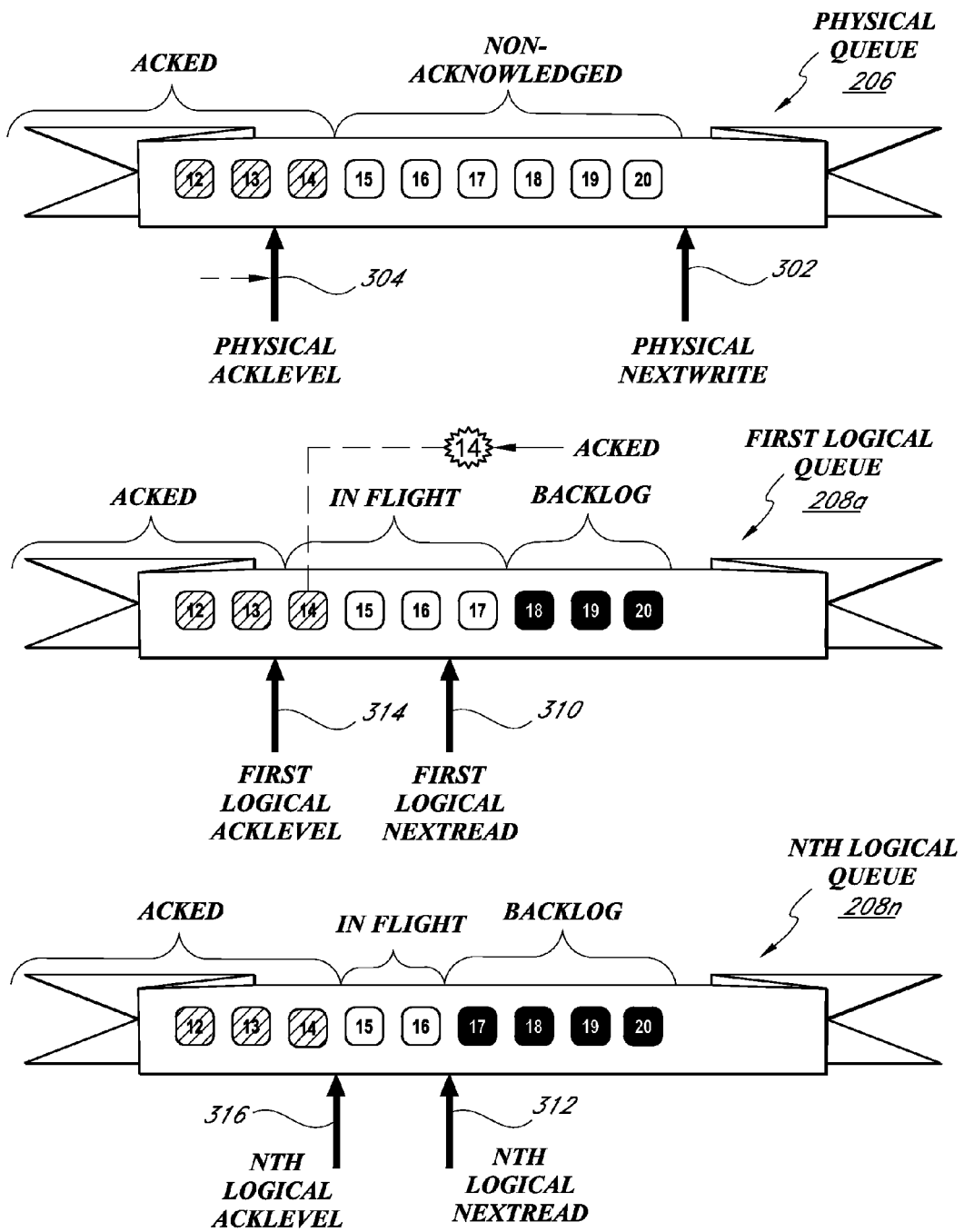

Once the nextRead pointer for a logical queue has been advanced, the newly dispatched message is considered "in flight" to the corresponding consumer until the broker 110 receives an ACK from the consumer indicating that it received and processed the message from the physical queue 206 without error. In one embodiment, a logical ACKlevel pointer specifies the message in the physical queue with the highest ACK ID for which all messages preceding the pointer (and equal to the pointer if the pointer points to the message itself, hereinafter referred to as "preceding") have been ACKed by all of the corresponding consumers. In the examples illustrated in FIG. 3B, the last message for which an ACK was received from first consumer 120a was message with ACK ID 13. However, as illustrated in FIG. 3C, first consumer 120a subsequently ACKs the message with ACK ID 14. Consequently, the first logical ACKlevel pointer 314 maintained by logical queue 208a is advanced to the next available message (i.e., message with ACK ID 14) in the physical queue 206 as shown in FIG. 3C. The messages with ACK IDs 12, 13, and 14 that are maintained by logical queue 208a are then considered ACKed. Moreover, all messages between first logical ACKlevel pointer 314 and first logical nextRead pointer 310 are considered to correspond to messages that are in flight to the corresponding consumer. In the example illustrated in FIG. 3C, messages with ACK IDs 15-17 are in flight after message with ACK ID 14 is ACKed.

As messages are dispatched to and ACKed by interested consumers, e.g., 120a-120n, ACKed messages may be deleted from the physical queue 206. As shown in FIG. 3B, for example, the messages that are to be deleted (e.g., messages with ACK IDs 12 and 13) are those preceding a physical ACKlevel pointer 304. The physical ACKlevel pointer specifies the highest ACKed message in the physical queue 206 for which all preceding messages have been ACKed. As will be described in more detail below in connection with FIGS. 3B and 3C, the physical ACKlevel pointer 304 is advanced based on the relative position of corresponding logical ACKlevel pointers maintained by each logical queue 208a-208n, where first logical queue 208a and $n^{th}$ logical queue 208n correspond to consumers 120a-120n, respectively. More specifically, the physical ACKlevel pointer 304 may be set for the physical queue 206 to the minimum logical ACKlevel pointer maintained by all of the logical queues and then all messages preceding the physical ACKlevel pointer 304 may be deleted from the physical queue 206.

In the example illustrated in FIGS. 3A and 3B, the $n^{th}$ logical ACKlevel pointer 316 maintained by $n^{th}$ logical queue 208n specifies a different message, e.g., a message with a larger ACK ID, than the first logical ACKlevel pointer 314 (i.e., message with ACK ID 14 rather than message with ACK ID 13). In this instance, the corresponding $n^{th}$ consumer 120n has processed more messages that first consumer 120a and thus, has ACKed message with ACK ID 14 as well as message with ACK ID 13. More specifically, first logical ACKlevel pointer 314 maintained by first logical queue 208a specifies message with an ACK ID (i.e., 13) that is less than the ACK ID for the message specified by the $n^{th}$ logical ACKlevel pointer 316 (i.e., 14). Therefore, the physical ACKlevel pointer 304 identifies the message corresponding to the ACK ID specified by the first logical ACKlevel pointer 314 (i.e., message with ACK ID 13).

However, as shown in FIG. 3C, once message 14 is ACKed by first consumer 120a and the first logical ACKlevel pointer 314 is advanced accordingly, the physical ACKlevel pointer 304 is advanced to specify the next non-acknowledged message in the physical queue (i.e., message with ACK ID 15). All of the messages preceding the physical ACKlevel pointer 304 (i.e., messages with ACK IDs 12, 13 and 14) may then be deleted from the physical queue 206.

Figure 3D:
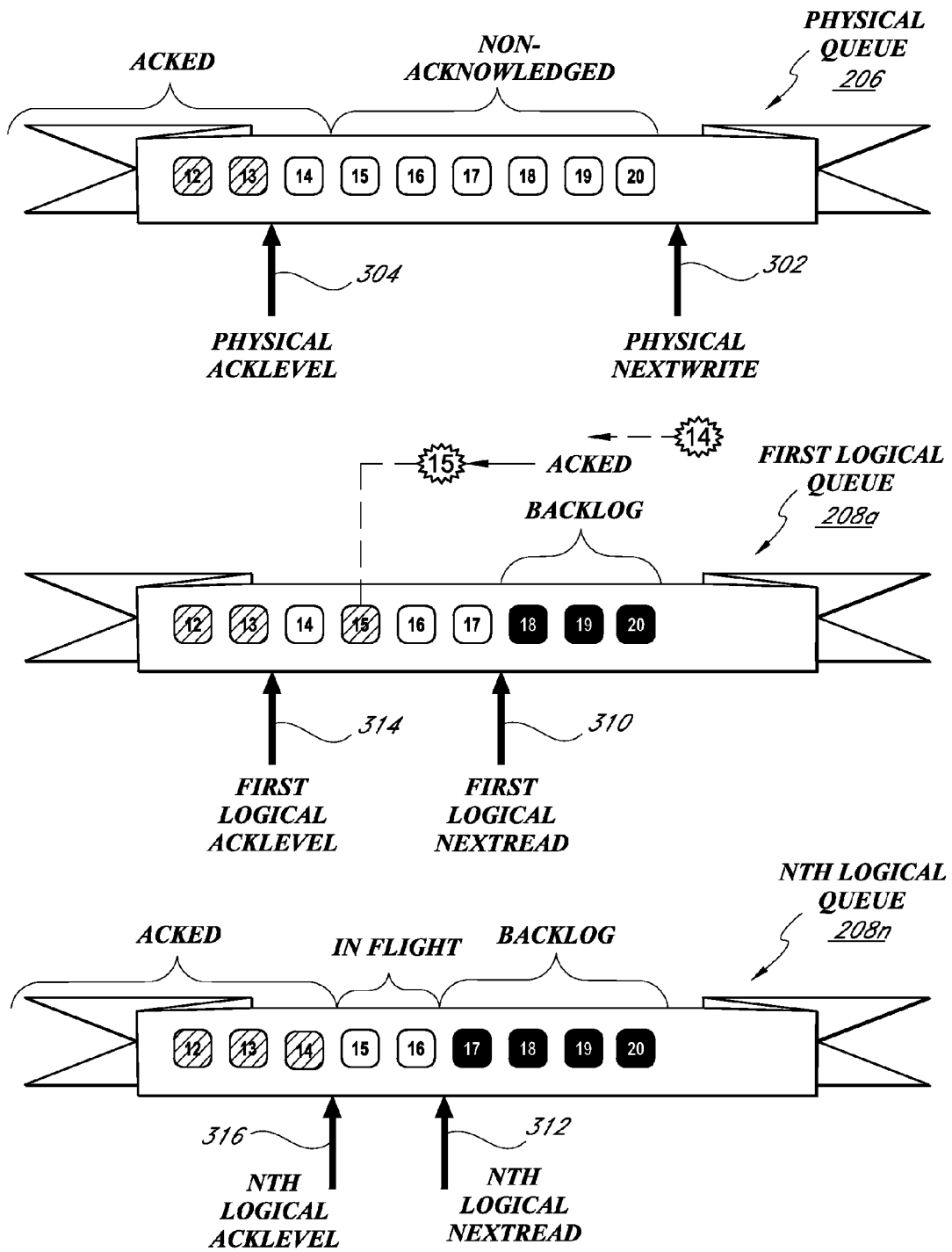
Figure 3E:
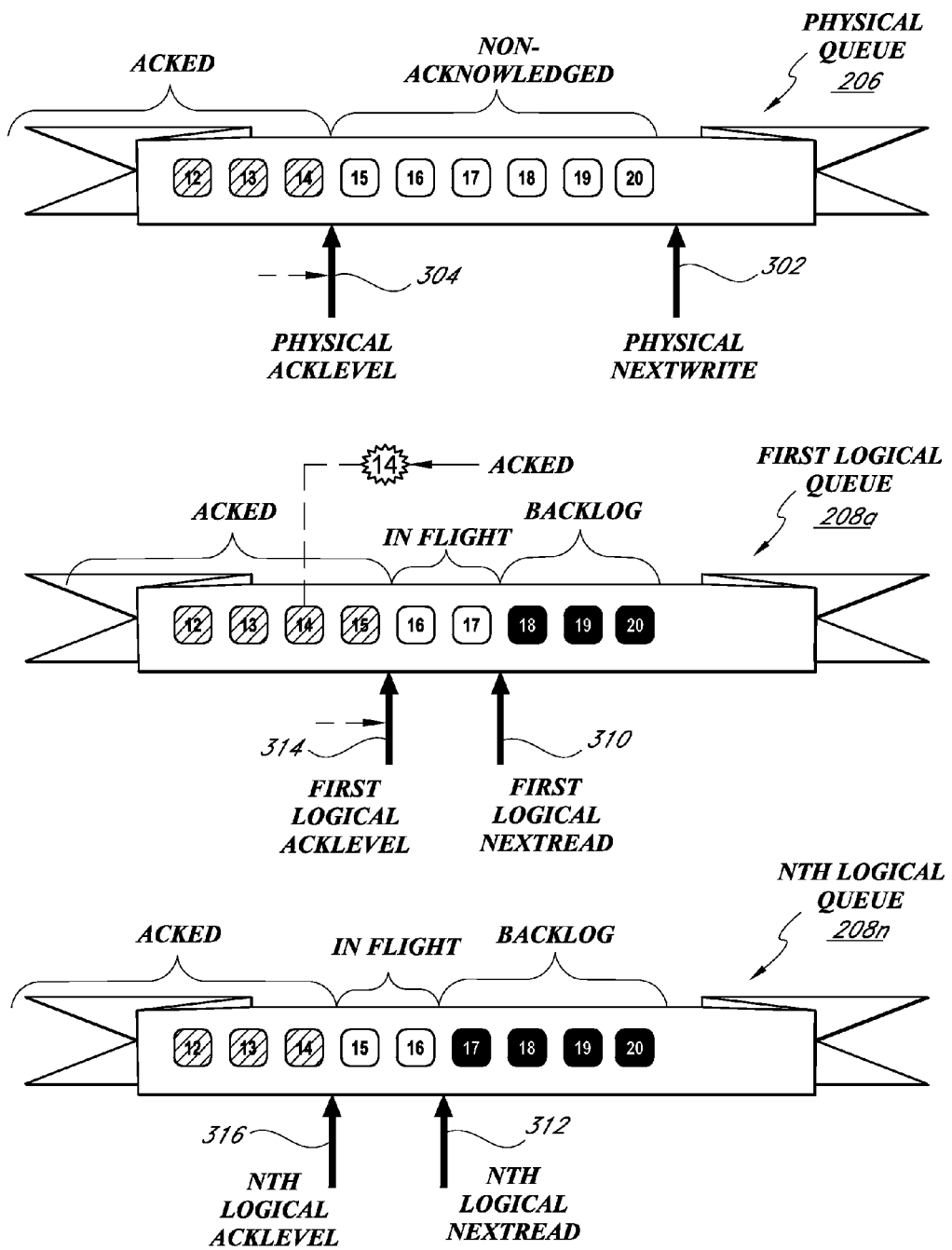

FIG. 3C illustrates the operation of the logical and physical pointers as messages are ACKed in sequential order. However, those skilled in the art will appreciate that messages may be received and/or processed by a consumer out of order. Consequently, messages may be ACKed out of order. FIGS. 3D and 3E illustrate the operation of the logical and physical pointers in such circumstances. Referring to FIG. 3D, first consumer 120a has ACKed the message with ACK ID 15 prior to ACKing the message with ACK ID 14. Consequently, the message with ACK ID 14 remains "in flight" and the first logical ACKlevel pointer 314 maintained by logical queue 208a cannot advance. Accordingly, only the messages with ACK IDs 12 and 13 as indicated by the first logical ACKlevel pointer 314 are considered ACKed.

Meanwhile, the $n^{th}$ logical ACKlevel pointer 316 maintained by $n^{th}$ logical queue 208n specifies a different message, e.g., a message with a larger ACK ID, than the first logical ACKlevel pointer 314 (i.e., message with ACK ID 14 rather than message with ACK ID 13). In this instance, the corresponding n[th] consumer 120n has processed more messages in sequential order than first consumer 120a and thus, has ACKed message with ACK ID 14 as well as message with ACK ID 13. More specifically, first logical ACKlevel pointer 314 maintained by first logical queue 208a specifies a message with an ACK ID (i.e., 13) that is less than the ACK ID for the message specified by the nth logical ACKlevel pointer 316 (i.e., 14), even though first consumer 120a has ACKed the message with ACK ID 15. Therefore, the physical ACKlevel pointer 304 identifies the message corresponding to the ACK ID specified by the first logical ACKlevel pointer 314 (i.e., message with ACK ID 13).

The first logical ACKlevel pointer 314 associated with the first logical queue 208a will not advance (and thus, the physical ACKlevel pointer 304 associated with the physical queue 206 will not advance) until the out of order messages (e.g., the message with ACK ID 14 in the illustrated example) are ACKed. For example, as shown in FIG. 3E, once the out of order message with ACK ID 14 is ACKed by the first consumer 120a, the first logical ACKlevel pointer 314 is advanced to the next available message (i.e., message with ACK ID 16) in the physical queue 206. As a result, the minimum logical ACKlevel pointer maintained by all of the logical queues is now the nth logical ACKlevel pointer 316 associated with the nth logical queue, which pointer indicates that messages with ACK IDs 12, 13 and 14 have been ACKed. The physical ACKlevel pointer 304 is therefore advanced to specify the next non-acknowledged message in the physical queue (i.e., message with ACK ID 15). All of the messages preceding the physical ACKlevel pointer 304 (i.e., messages with ACK IDs 12, 13 and 14) may then be deleted from the physical queue 206.

Those skilled in the art will appreciate from the above description that a message is not deleted from the physical queue 206 until all interested consumers have received, processed and ACKed the message. However, problems may arise if: (1) a consumer cannot process a message and thus, transmits a negative acknowledgement message ("NACK") back to broker 110; or (2) an ACK is not received from the consumer within a certain time period (which is also considered a "NACK," albeit system generated). In such cases, messages may continue to be enqueued to and dispatched from the physical queue 206. However, if ACK IDs are not received from one or more consumers, the logical ACKlevel pointers for such consumers will not advance. As a result, the physical ACKlevel pointer for the physical queue 206 will also fail to advance and additional messages will not be deleted from the physical queue 206. A message for which a NACK is repeatedly obtained and that prevents appropriate and timely release of resources from the physical queue may be referred to as a "poison pill."

To remedy the poison pill situation, one or more error message queues may be stored in persistent memory 214 of the broker 110. An error message queue may store messages and their corresponding ACK IDs that a consumer cannot process properly because the messages are themselves faulty (i.e., "bad" messages). If a message is determined to be "bad," broker 110 deletes the bad message from the physical queue and enqueues the bad message into an error message queue. Accordingly, the logical ACKlevel for the consumer (and thus, physical ACKlevel for the physical queue 206) will be allowed to advance. However, it may be possible that rather than a bad message, a consumer itself has experienced a problem or failure (i.e., it is an "unhealthy" consumer). In such cases, every message dispatched to the unhealthy consumer may fail and thus, cause the error message queue to fill too quickly. Accordingly, in one embodiment, the bad messages are not enqueued to the error message queue. Rather, the logical queue corresponding to the unhealthy consumer is allowed to stagnate until the unhealthy consumer again begins ACKing messages. In those instances where an unhealthy consumer is identified by the broker 110 after some messages have already been identified as bad and stored in the error message queue, a system administrator may manually move or another software component may move the messages from the error message queue to the physical queue 206.

In one embodiment, broker 110 uses a heuristic algorithm to differentiate between bad messages and messages that cannot be processed due to an unhealthy consumer. For example, the broker 110 may determine the percentage of in flight messages to a consumer that have been ACKed. If the percentage of ACKed messages meets or exceeds a certain threshold, e.g., 90%, the broker 110 considers the given message bad and stores the bad message in the error message queue. However, if the percentage of ACKed messages falls beneath the threshold, the broker 110 determines that the consumer is unhealthy and does not enqueue any further messages in the error message queue as noted above. Those skilled in the art will appreciate that various types and combinations of heuristic algorithms may be used to distinguish between bad messages and unhealthy consumers. In addition, such heuristic algorithms may vary in complexity and may be adaptive.

Figure 4:
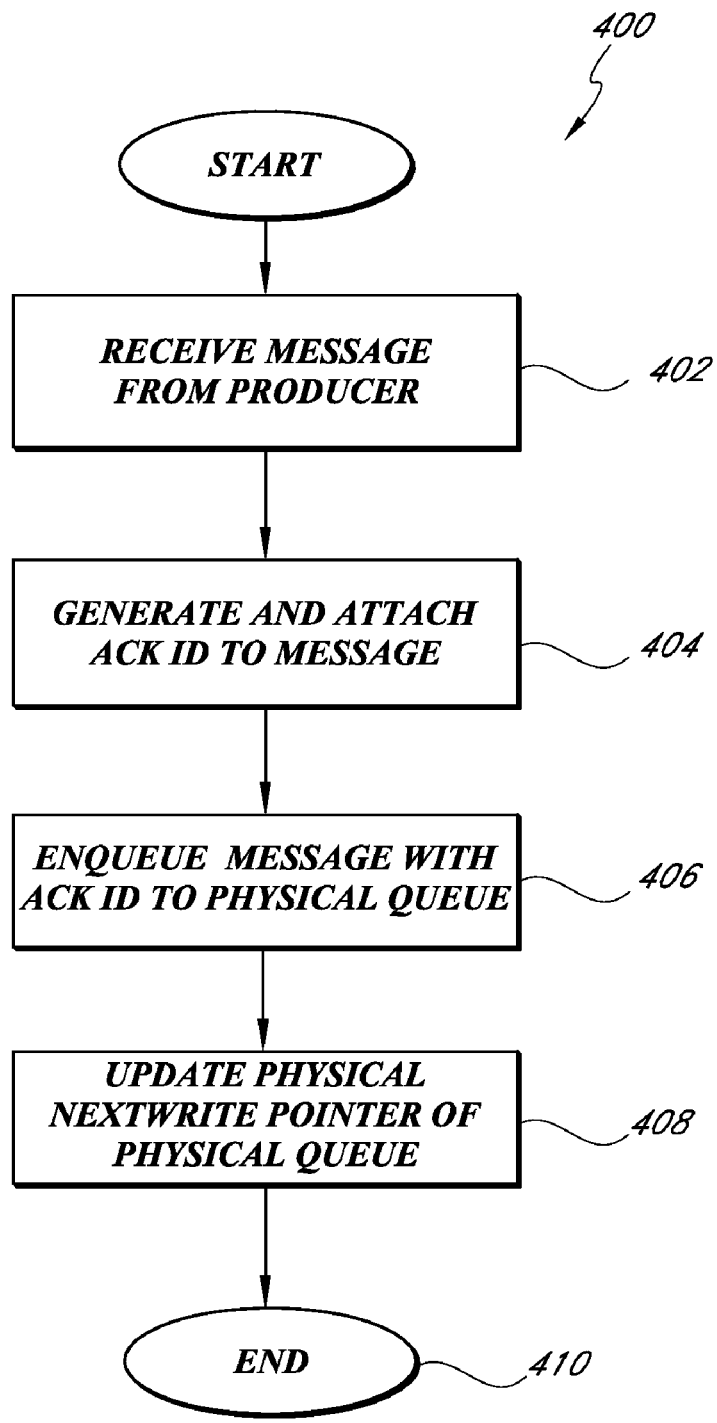
FIG. 4 is a flow diagram of an illustrative method for updating the queues maintained by the broker as messages are enqueued by producers.

FIG. 4 is a flow diagram of an illustrative method 400 for updating the physical queue 206 and logical queues 208a-208n maintained by the broker 110 as messages are enqueued by producers 102a-102n. In one embodiment, the method 400 is implemented by the broker 110. In block 402, the broker 110 receives a message from a producer. The broker then assigns an ACK ID to the message in block 404. As noted above, in one embodiment, incoming messages are assigned ACK IDs in monotonically increasing order as messages are received. Next in block 406, the broker 110 enqueues the message with ACK ID in physical queue 206 for later dispatch. For example, when the broker 110 receives a request from an interested consumer, the broker 110 may dispatch a copy of the message to the consumer. In some embodiments, the physical queue 206 stores meta-data associated with the message and its ACK ID with the stored message. The meta-data can identify a primary broker processing the message, and any backup brokers that may assume message managing responsibilities if the primary broker malfunctions. After enqueuing the message in the physical queue, the broker 110 updates the physical nextWrite pointer 302 of the physical queue in block 408. More specifically, the broker 110 advances the nextWrite pointer 302 to the next available position at the end of the physical queue 206. The method 400 then ends in block 412.

Figure 5:
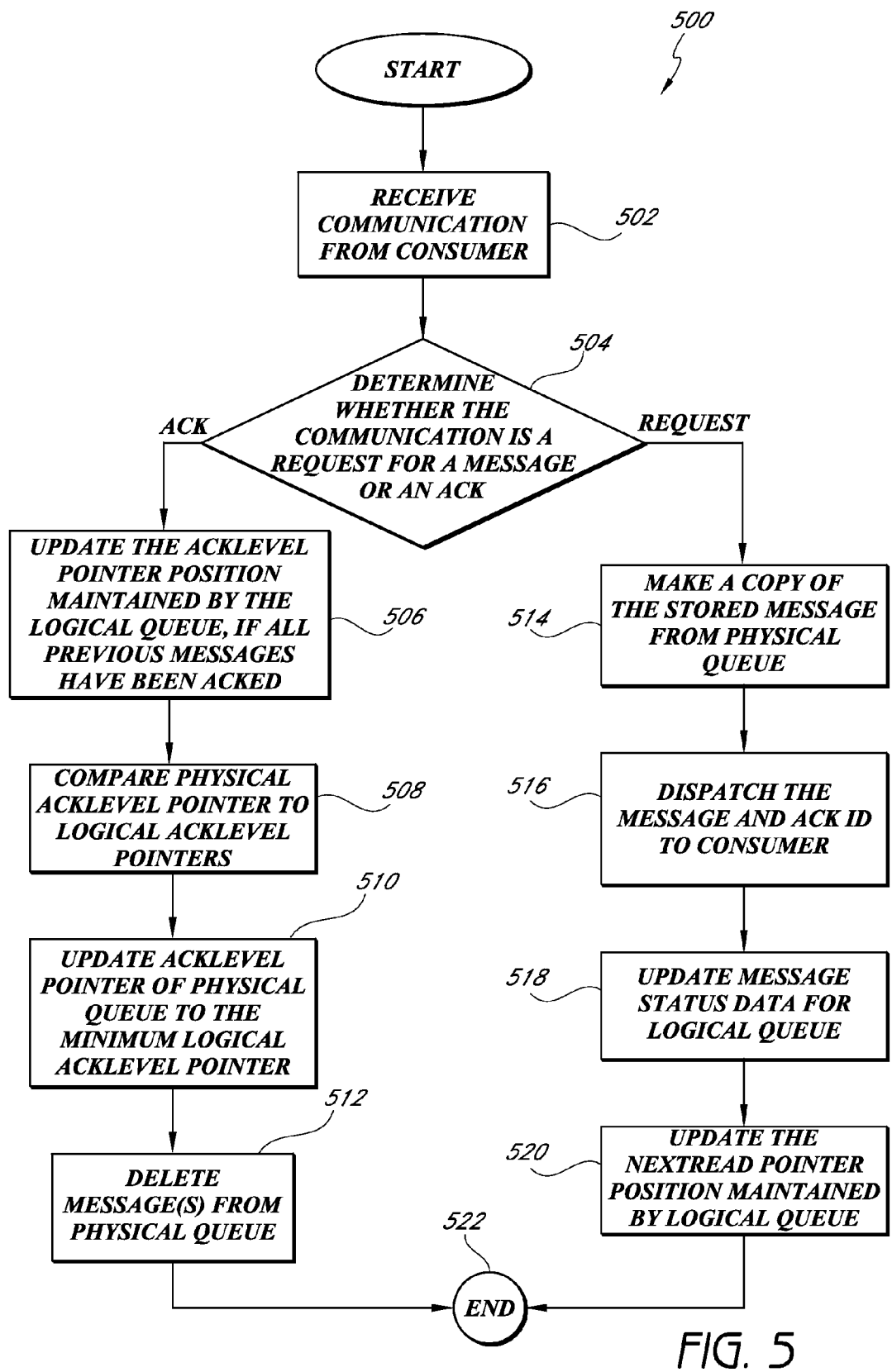
FIG. 5 is a flow diagram of an illustrative method for updating the queues maintained by the broker as messages are dispatched and acknowledged by consumers.

FIG. 5 is a flow diagram of an illustrative method 500 for updating the physical queue 206 and the pointers maintained by the logical queues 208a-208n as messages are dispatched to and acknowledged by consumers 120a-120n. In one embodiment, the method 400 is implemented by the broker 110. It is assumed for purposes of this flow diagram that messages with corresponding, monotonically increasing ACK IDs have already been stored in the physical queue 206. In block 502, broker 110 receives a communication from a consumer. In decision block 504, the broker 110 determines whether the communication is a request for a message or an ACK for a previously dispatched message. In some embodiments, the ACK received from the consumer includes the ACK ID assigned to the message. If the message is an ACK, a logical ACKlevel pointer maintained by the logical queue corresponding to the consumer from which the ACK was received, may be advanced in block 506. More specifically, the logical ACKlevel pointer will be advanced if all messages preceding the current ACKed message have been ACKed by the corresponding consumer. As noted above, the logical ACKlevel pointer specifies the message in the physical queue 206 with the highest ACK ID for which all preceding messages have been ACKed by the corresponding consumer. Therefore, if any messages preceding the current ACKed message have not been ACKed by the corresponding consumer, the logical ACKlevel pointer will not advance.

Next, in block 508, the broker 110 compares the logical ACKlevel pointer maintained by each logical queue in order to identify the minimum ACKlevel pointer amongst all logical queues. For example, more that one consumer may be interested in the message. A copy of the message may have been dispatched to multiple consumers, each associated with its own logical queue. However, it is also possible that a copy of the message may not yet have been dispatched to all interested consumers or that the corresponding customer is not interested in the message. Accordingly, the logical ACKlevel pointers may vary across the logical queues. By setting the physical ACKlevel pointer to the minimum ACKlevel pointer across logical queues, the broker 110 ensures that it does not delete messages from the physical queue 206 that have not been dispatched to interested consumers. Once the minimum ACKlevel pointer is identified, the broker updates the physical ACKlevel pointer for the physical queue to specify the next non-acknowledged message in the physical queue in a block 510. Then the broker 110 deletes all messages from the physical queue preceding the physical ACKlevel pointer. By deleting successfully dispatched messages, the broker 110 frees up its memory resources to store additional incoming messages. After deleting the messages, the method 500 ends in block 522.

In some embodiments, the physical ACKlevel pointer is updated and the messages deleted upon identification of the minimum logical ACKlevel pointer. However, in other embodiments, the physical ACKlevel pointer is updated and/or the messages deleted lazily at some point following identification of the minimum logical ACKlevel pointer. For example, the messages may be deleted from the physical queue during off-peak processing times, or at timed periodic or aperiodic intervals. Such lazy updates may also provide for fault tolerance and improved likelihood of survival in the event of system failure.

Returning to decision block 504, if the communication is a request for a message from a consumer, the broker 110 requests the next available, non-dispatched message for the consumer from the physical queue 206 and makes a copy of it at block 514. As noted above, the next available, non-dispatched message is the first message following the logical nextRead pointer maintained by the logical queue for the consumer. The broker 110 then dispatches the copy to the consumer in block 516. Next, in block 518, the broker 110 updates the messages status data for the logical queue. As noted above, such message status data may include whether the message is in flight to the consumer, ACKed by the consumer, or whether the message is backlogged waiting to be provided to the consumer. Accordingly, when a copy of a message is dispatched in block 516, the broker updates the message status data for the logical queue to reflect that the message is in flight to the corresponding consumer. In addition, the broker 110 may also store, e.g., the time the message was dispatched to the consumer.

Finally, in block 520, the broker 110 updates the logical nextRead pointer of the logical queue. More specifically the broker advances the nextRead pointer maintained by the logical queue to the next message in the physical queue 206. The method 500 then ends in block 522. Those skilled in the art will appreciate that methods 400 and 500 may be repeated as the broker receives messages from producers, ACKs from consumers and requests for messages from consumers. As a result, the physical queue 206 and logical queues 208a-208n are continuously updated.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Computer-executable components may be stored, for example, in a non-transitory computer-readable medium. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more processors implementing a broker that
   receives messages from the one or more producers for dispatch to a plurality of consumers including a first consumer, wherein the broker maintains:
   a physical queue storing the messages generated by the one or more producers, wherein each message stored in the physical queue is associated with an identifier, wherein the physical queue has associated therewith a first physical pointer and a second physical pointer, and wherein the first physical pointer indicates a next unacknowledged message in the physical queue, and the second physical pointer indicates a location for writing a next message in the physical queue;
   a first logical queue managing a first logical pointer and a second logical pointer of the first logical queue, wherein the first logical pointer indicates an identifier of a next in flight message in the physical queue that is yet to be acknowledged by the first consumer and the second logical pointer indicates an identifier of a next backlogged message in the physical queue that is to be dispatched to the first consumer; and a second logical queue managing a first logical pointer and a second logical pointer of the second logical queue, wherein the first logical pointer indicates an identifier of a next in flight message in the physical queue that is yet to be acknowledged by a second consumer and the second logical pointer indicates an identifier of a next backlogged message in the physical queue that is to be dispatched to the second consumer;

wherein the broker updates the position of the first physical pointer based at least in part on a minimum of the first pointer of the first logical queue and the first pointer of the second logical queue; and a memory in communication with the one or more processors, wherein the memory stores at least one of the physical queue and the logical queue.

2. The system of claim 1 further comprising an $n^{th}$ consumer that consumes messages generated by one or more producers.

3. The system of claim 1, wherein the broker maintains an $n^{th}$ logical queue, wherein the $n^{th}$ logical queue manages a first logical pointer and a second logical pointer of the $n^{th}$ logical queue, wherein the first logical pointer indicates an identifier of a next in flight message in the physical queue that is yet to be acknowledged by an $n^{th}$ consumer and the second logical pointer indicates an identifier of a next backlogged message in the physical queue that is to be dispatched to the $n^{th}$ consumer, and wherein the broker updates the position of the first physical pointer based on a minimum of the first pointer of the first logical queue and the first pointer of the $n^{th}$ logical queue.

4. The system of claim 2, wherein the broker deletes one or more acknowledged messages from the physical queue based at least in part on the position of the first physical pointer.

5. The system of claim 1, wherein the broker updates the second physical pointer of the physical queue based on receiving a message from one or more producers.

6. The system of claim 1, wherein the broker updates the position of the second logical pointer of the first logical queue based on dispatching a message to the first consumer.

7. The system of claim 1, wherein the first consumer comprises a group of consumer instances.

8. The system of claim 1, wherein the physical queue is stored in persistent memory accessible to the broker.

9. The system of claim 1, wherein the logical pointers managed by the first logical queue are stored in transient memory accessible to the broker.

10. The system of claim 1, wherein the broker maintains an error message queue for bad messages generated by one or more producers.

11. A computing device comprising:
a persistent memory for storing a physical queue, the physical queue storing the messages generated by the one or more producers, wherein the physical queue has associated therewith a first physical pointer and a second physical pointer, and wherein the first physical pointer indicates a minimum of acknowledged messages that have been acknowledged as received, and the second physical pointer indicates a next location for writing a message in the physical queue;

a transient memory for storing:
a first logical pointer and a second logical pointer associated with a first consumer, and wherein the first logical pointer associated with the first consumer indicates a message that is yet to be acknowledged by the first consumer and the second logical pointer associated with the first consumer indicates a message that is to be dispatched to the first consumer;

a first logical pointer and a second logical pointer associated with a second consumer, and wherein the first logical pointer associated with the second consumer indicates a message that is yet to be acknowledged by the second consumer and the second logical pointer associated with the second consumer indicates a message that is to be dispatched to the second consumer; and at least one physical processor in communication with the persistent memory and the transient memory, the at least one physical processor executing a broker component that maintains the physical queue and the logical pointers, wherein the broker component determines the first physical pointer based at least in part on a minimum of at least the first logical pointer associated with the first consumer and the first logical pointer associated with the second consumer.

12. The computing device of claim 11, wherein the transient memory further stores a first logical pointer and a second logical pointer associated with an $n^{th}$ consumer, wherein said first logical pointer indicates a message that is to be acknowledged by the $n^{th}$ consumer and said second logical pointer indicates a message that is to be dispatched to the $n^{th}$ consumer.

13. The computing device of claim 12, wherein the broker component further maintains the logical pointers associated with the $n^{th}$ consumer.

14. The computing device of claim 13, wherein the broker component determines the first physical pointer based at least in part on the minimum of the first logical pointer associated with the first consumer and the first logical pointer associated with the $n^{th}$ consumer.

15. The computing device of claim 14, wherein the broker component deletes the minimum of acknowledged messages.

16. The computing device of claim 12, wherein the broker component updates the second physical pointer of the physical queue based on receiving a message from one or more producers.

17. The computing device of claim 12, wherein the broker component updates the position of the second logical pointer associated with the first consumer and the second logical pointer associated with the $n^{th}$ consumer based on dispatching a message.

18. The computing device of claim 11, wherein first consumer comprises a group of consumer instances.

19. The computing device of claim 11, wherein the broker component stores messages in the physical queue in a monotonically increasing order.

20. The computing device of claim 11, wherein the broker component maintains an error message queue for messages the broker component determines cannot be processed by a consumer.

21. The computing device of claim 20, wherein the broker component utilizes heuristics to determine if a message cannot be processed by the consumer because the message is faulty or because the consumer is unhealthy.

22. A computer-implemented method for updating a physical queue of messages, the computer-implemented method comprising:
as implemented by one or more physical processors configured with specific executable instructions,
for each message received from a producer and in which a consumer is interested, assigning an acknowledgment identifier to the message;

storing the message to the physical queue;
storing the acknowledgement identifier; and
for each message dispatched to at least one interested consumer of a plurality of interested customers from the physical queue and for which the acknowledgement identifier has been returned by the at least one interested consumer,
advancing a logical acknowledgment level pointer maintained by a first logical queue of a plurality of logical queues, wherein the first logical queue is associated with the at least one interested consumer, and wherein the logical acknowledgement level pointer of the first logical queue identifies the acknowledgement identifier in the physical queue that has been returned by the interested consumer; and
setting a physical acknowledgment level pointer to a position in the physical queue that corresponds to a minimum logical acknowledgment level pointer of the plurality of logical queues, wherein each logical queue of the plurality of logical queues is associated with an interested consumer of the plurality of interested customers, and wherein each logical queue of the plurality of logical queues maintains acknowledgement level pointers for an associated interested consumer.

23. The computer-implemented method of claim 22 further comprising:
deleting one or more messages from the physical queue based on the position of the physical acknowledgment level pointer.

24. The computer-implemented method of claim 22, wherein acknowledgment identifiers are assigned to messages in monotonically increasing order.

25. The computer-implemented method of claim 22 further comprising:
for each message received from a producer,
advancing a physical next write pointer to the physical queue, the physical next write pointer identifying a next location for writing a message in the physical queue.

26. The computer-implemented method of claim 22 further comprising:
for each message dispatched to the at least one interested consumer from the physical queue,
advancing a logical next read pointer maintained by the logical queue associated with the at least one interested consumer, the logical next read pointer identifying an acknowledgement identifier of the message in the physical queue with the highest acknowledgement identifier for which messages preceding said message have been acknowledged by the at least one interested consumer.

27. The computer-implemented method of claim 22 further comprising:
for each message dispatched to the at least one interested consumer from the physical queue but for which the acknowledgement identifier has not been returned by the at least one interested consumer,
storing the message in an error message queue.

28. The computer-implemented method of claim 27 further comprising:
determining if the acknowledgment identifier has not been returned by the at least one interested consumer because the at least one interested consumer is unhealthy; and
if the at least one interested consumer is unhealthy, discontinuing to store messages dispatched to the at least one unhealthy consumer to the error message queue.

29. A non-transitory computer-readable medium having a computer-executable component for managing a physical queue of messages, wherein the messages are received from one or more producers and are dispatched to one or more consumers, the computer-executable component comprising:
a broker component operative to:
enqueue messages generated by the one or more producers to a physical queue stored in a persistent memory, wherein each message stored in the physical queue is associated with an identifier, wherein the physical queue has associated therewith a first physical pointer and a second physical pointer, and wherein the first physical pointer indicates a next unacknowledged message in the physical queue, and the second physical pointer indicates a next position in the physical queue for enqueuing a new message;
manage a plurality of logical queues stored in a transient memory, wherein each logical queue corresponds to a consumer and maintains a first logical pointer and a second logical pointer, and wherein the first logical pointer indicates an identifier of a next in flight message in the physical queue that is yet to be acknowledged by the consumer and the second logical pointer indicates an identifier of a next backlogged message in the physical queue that is to be dispatched to the consumer; and
delete one or more acknowledged messages from the physical queue preceding the first physical pointer, wherein the first physical pointer is positioned based at least in part on a minimum of at least two logical pointers maintained by at least two of the plurality of logical queues.

30. The computer-readable medium of claim 29, wherein the broker component is further operative to advance the first logical pointer maintained by a logical queue when an in flight message is acknowledged by the consumer corresponding to the logical queue.

31. The computer-readable medium of claim 29, wherein the broker component is further operative to advance the second logical pointer maintained by a logical queue when a backlogged message is dispatched to the consumer corresponding to the logical queue.

32. The computer-readable medium of claim 29, wherein the broker component is further operative to advance the second physical pointer of the physical queue when a new message is enqueued to the physical queue.

33. The computer-readable medium of claim 29, wherein the broker component assigns identifiers to messages in a monotonically increasing order.

34. The computer-readable medium of claim 29, wherein the broker component is further operative to enqueue messages to an error message queue when a negative acknowledgement for the message is repeatedly obtained.

* * * * *